US008537338B1

(12) United States Patent
Medasani et al.

(10) Patent No.: US 8,537,338 B1
(45) Date of Patent: Sep. 17, 2013

(54) STREET CURB AND MEDIAN DETECTION USING LIDAR DATA

(75) Inventors: Swarup S. Medasani, Thousand Oaks, CA (US); Yuri Owechko, Newbury Park, CA (US); Thommen Korah, Marina Del Rey, CA (US)

(73) Assignee: HRL Laboratories, LLC, Malibu, CA (US)

( * ) Notice: Subject to any disclaimer, the term of this patent is extended or adjusted under 35 U.S.C. 154(b) by 181 days.

(21) Appl. No.: 13/216,580

(22) Filed: Aug. 24, 2011

(51) Int. Cl.
*G01C 3/08* (2006.01)
*G06K 9/00* (2006.01)
*G06K 9/48* (2006.01)

(52) U.S. Cl.
USPC .......... 356/4.01; 382/100; 382/103; 382/104; 382/199

(58) Field of Classification Search
USPC ................. 356/4.01; 382/100, 103, 104, 199
See application file for complete search history.

(56) References Cited

PUBLICATIONS

Zhu, Qihui, et al, A Minimum Cover Approach for Extracting the Road Network form Airborne Lidar Data, Sep. 27, 2009-Oct. 4, 2009, IEEE 12th International Conference on , vol., No., pp. 1582,1589.*
Hollaus, M., Delineation of Vegetation and Building Polygons from Full-waveform Airborne Lidar Data using OPALS Software, Nov. 2010, ASPRS/CaGIS 2010 Fall Specialty Conference.*
U.S. Appl. No. 12/644,349, filed Dec. 22, 2009, Thommen Korah.
3D Laser-based obstacle detection for autonomous driving, Dirk Hahnel and Sebastian Thrun, IROS 2008.
Se S and Brady M, Vision-based detection of kerbs and steps, British Machine Vision Conference, 1997.
Lu X and Manduchi R, Detection and localization of curbs and stairways using stereo-vision, ICRA 2005.
W S Wijesoma, KRS Kodagoda, and AP Balasuriya, Road Boundary detection and tracking using LIDAR sensors, IEEE transactions on robotics and automation, 2004 20(3), 456-464.
E. D Dickmanns and BD Mysliwetz, Recursive 3-D road and relative ego-state recognition, IEEE PAMI 1992 (14), 199-213.
S. Medasani and R. Krishnapuram, "Detection of the Number of components in Gaussian mixtures using agglomerative clustering," Intl. Conf on neural Networks, 1997.

* cited by examiner

*Primary Examiner* — Isam Alsomiri
*Assistant Examiner* — Vicente Rodriguez
(74) *Attorney, Agent, or Firm* — Ladas & Parry

(57) ABSTRACT

A method of extracting street and road data from a dataset obtained using LIDAR techniques to scan a terrestrial region of the earth's surface of interest to form the dataset. The method includes: converting the dataset into an implicit representation using a population function; converting the implicit representation into 2D point data which are supplied to an agglomerative Gaussian mixture decomposition module, the agglomerative Gaussian mixture decomposition module automatically and parsimoniously fitting the 2-D point data with a set of Gaussian components; and modeling a segment of a street grid in the dataset by Gaussian models and constraining the Gaussian models to align with each other and a dominant orientation of the streets in order to detect streets. Ray tracing techniques may be used to detect curbs and medians.

10 Claims, 6 Drawing Sheets

 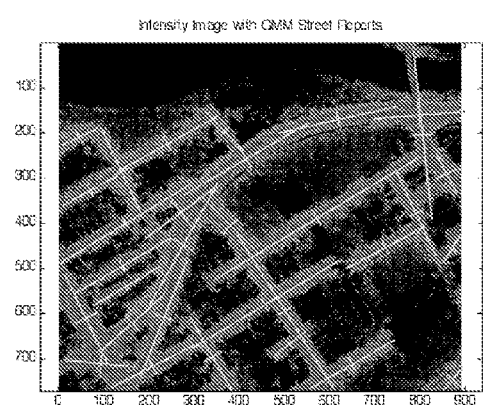
Fig 3a        Fig 3b
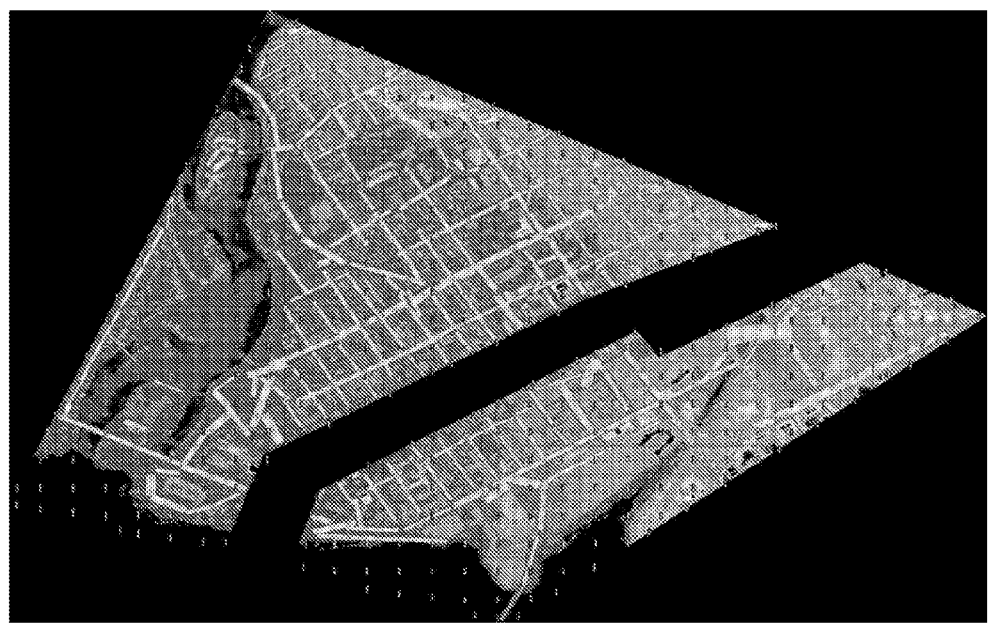
Fig 4

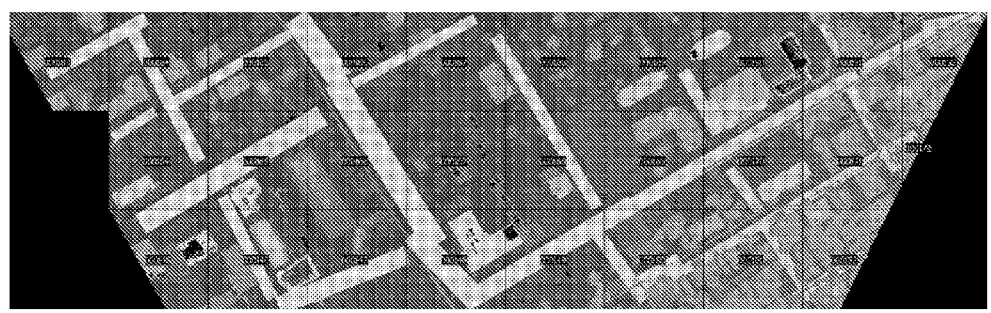
Fig. 5
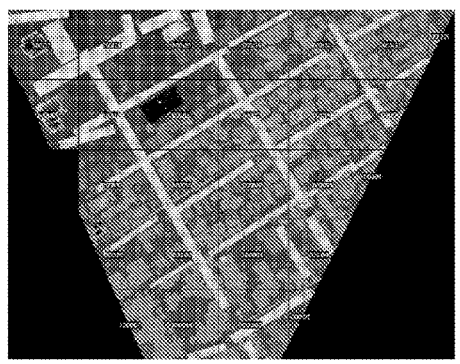 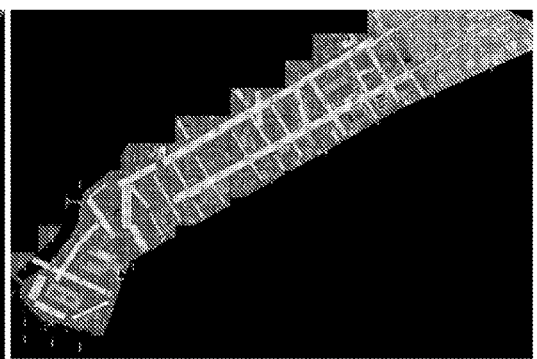
Fig 6a　　　　　　　　　Fig 6b

STREET CURB AND MEDIAN DETECTION USING LIDAR DATA

GOVERNMENT CONTRACT

This invention was made under US Government Contract HM1582-07-C-0017 and therefor the US Government has certain rights in this invention.

CROSS REFERENCE TO RELATED APPLICATIONS

U.S. patent application Ser. No. 12/644,349 filed Dec. 22, 2009 and entitled "Strip Histogram Grid for Efficient Segmentation of 3D Point Clouds from Urban Environments", the disclosure of which is hereby incorporated herein by reference.

TECHNICAL FIELD

Light Detection and Ranging (LIDAR) is a remote sensing technology used to collect topographic data that includes natural terrain features, buildings, vegetation, roads, etc. This disclosure related to the automated extraction and display of street curb and median data from such 3D LIDAR-generated topographic data.

BACKGROUND

Light Detection and Ranging (LIDAR) is a remote sensing technology used to collect topographic data, for example. A conventional LIDAR system combines an optical laser with an optical receiver system, the laser generating an optical pulse that is transmitted downward from an aircraft or satellite (a non-terrestrial vehicle) overflying an terrestrial area of interest or even from a terrestrial vehicle which has a view of an terrestrial area of interest. The transmitted optical pulse reflects off an object on the ground or even the ground itself and returns to the receiver system. The receiver system accurately measures the travel time of the pulse from its transmission to its return to the receiver system and therefore the distance to the object or the ground from the vehicle (terrestrial or non-terrestrial) can be easily calculated given the fact that an optical pulse travels at the speed of light. Assuming the vehicle knows it current position (using a global positioning system and an inertial measurement unit (IMU) or other navigation means), utilizing the range to the object and a laser scan angle (if other than horizontal), the height of the various objects encountered (as well as the height of the ground when it is detected) can be collected in a very fine grid (dataset) over the terrestrial area of interest. The aircraft/satellite/vehicle position from its GPS and IMU or other navigation means supplies the x and y coordinates of the dataset and the height measured for each x, y coordinate position provides a corresponding z value in the dataset.

LIDAR is being used by the National Oceanic and Atmospheric Administration (NOAA) and NASA scientists to document, for example, topographic changes along shorelines. These datasets are collected with aircraft-mounted lasers presently capable of recording elevation measurements at a rate of 2,000 to 5,000 pulses per second and presently having a vertical precision of 15 centimeters (6 inches). After a baseline dataset has been created, follow-up flights can be used to detect shoreline changes, new streets and other topographic changes.

Recognizing, segmenting, and extracting roads, curbs, and medians from LIDAR datasets collected in urban environments is a critical technology for intelligence agencies in the automatic acquisition and updating of geographic information systems. Road and street grids also play an important and useful role in mission planning, mapping, traffic analysis, and navigation. Furthermore, awareness and understanding of vehicle surroundings is critical for driver assistance and avoiding accidents. Curb and median detection and awareness is useful in many applications such as navigation, driver assistance, aids for visually impaired, etc.

Most of the previous road detection work has focused on the detection of rural roads from low resolution vision sensors. These sensors are either mounted on satellites or high-flying UAVs. The underlying assumption in these approaches is that imaged street pixels are different from pixels of other features such as buildings, roofs, parking lots, etc. Aerial image analysis algorithms that use pixel classification schemes are used to detect roads and streets. Most approaches concentrate on starting with manually ascribed seed pixels which are grown into entire streets using pixel intensity coherence and contiguity constraints. Pixel classification methods, however, suffer from variations in illumination, viewing conditions, and road surface materials, and do not take into account the geometric properties of the road neighborhoods. Some of these approaches use training instances to learn the statistical characteristics of the road regions and use the elicited features to detect streets and roads. These systems, however, are not general enough and constrain themselves to a particular road type. In addition, most of the systems use monocular cameras and can only find streets and are not robust or do not find curbs and medians. Some systems use elaborate stereo cameras to detect curbs, but such systems have limited range. See:

1) 3D Laser-based obstacle detection for autonomous driving, Dirk Hahnel and Sebastian Thrun, *IROS* 2008.
2) Se S. and Brady M., Vision-based detection of kerbs and steps, *British Machine Vision Conference*, 1997.
3) Lu X. and Manduchi R., Detection and localization of curbs and stairways using stereo-vision, *ICRA* 2005.
4) W. S. Wijesoma, K. R. S. Kodagoda, and A. P. Balasuriya, Road Boundary detection and tracking using LIDAR sensors, *IEEE Transactions on Robotics and Automation*, 2004 20(3), 456-464.
5) E. D. Dickmanns and B. D. Mysliwetz, Recursive 3-D road and relative ego-state recognition, *IEEE PAMI* 1992 (14), 199-213.
6) S. Medasani and R. Krishnapuram, "Detection of the Number of components in Gaussian mixtures using agglomerative clustering," *Intl Conf. on Neural Networks*, 1997, the disclosure of which is hereby incorporated herein by reference.

This disclosure relates to combining 3D LIDAR sensing with 2D/3D model detection methods in an attempt to find streets, curbs, and medians. The combination of robust and constrained mixture decomposition algorithms, and context-utilization for detection of curbs and medians operating on 3D LIDAR data is heretofore is believed to be unknown. The objective function used in the constrained mixture decomposition is also believed to be unknown in this context. The objective function used to cluster is known per se in the prior art but the constraints under which the technique is adapted to work with LIDAR point clouds to detect linear road-like objects is as disclosed herein is believed to be unknown.

BRIEF DESCRIPTION OF THE INVENTION

In one aspect the present invention provides method of extracting street and road data from a dataset obtained using LIDAR techniques to scan a terrestrial region of the earth's surface of interest to form the dataset, the method comprising the steps of: converting said dataset into an implicit representation using a population function; flattening the implicit representation into a 2D image; converting the 2D image into 2D point data which are supplied to an agglomerative Gaussian mixture decomposition module, the agglomerative Gaussian mixture decomposition module automatically and parsimoniously fitting the 2D point data with a set of Gaussian components; and modeling a segment of a street grid in the dataset by Gaussian models and constraining the Gaussian models to align with each other and a dominant orientation of the streets in order to detect streets.

In another aspect the present invention relates to a method of extracting curb data from street and road data obtained from a dataset obtained using LIDAR techniques to scan a terrestrial region of the earth's surface of interest to form said dataset, the method comprising the steps of: inputting data representing the street and road data input into a ray tracing algorithm along with a slice of the dataset around detected streets, finding gradients in the slice of data and filtering the gradients so that only abrupt gradient changes remain, the ray tracing algorithm finding curb and median points using the abrupt gradient changes; and using heuristic associations or algorithms to stitch detected curb and median points into said curb data associated with said street grid.

In yet another aspect the present invention relates to a method of extracting curb and median data from street and road data obtained from a dataset obtained using LIDAR techniques to scan a terrestrial region of the earth's surface of interest to form said dataset, the method comprising the steps of: inputting data representing the street and road data input into a ray tracing algorithm along with a slice of the dataset around detected streets, the ray tracing algorithm finding curb and median points; and using heuristic associations or algorithms to stitch detected curb and median points into said curb and median data associated with said street grid.

BRIEF DESCRIPTION OF THE DRAWINGS

FIGS. 3a and 3b depict a segment of the Ottawa street Grid and the detected Gaussians represented using their minor and major axis. FIG. 3a depicts the original intensity data while FIG. 3b presents the detected line segments.

FIG. 4 depicts the Ottawa Downtown Street Grid and the detected Gaussians represented using their major axis.

FIG. 5 is an example of the detected streets in a portion of Ottawa downtown.

FIGS. 6a and 6b are examples of the detected streets in a portion of Ottawa downtown.

DETAILED DESCRIPTION

Figure 1:
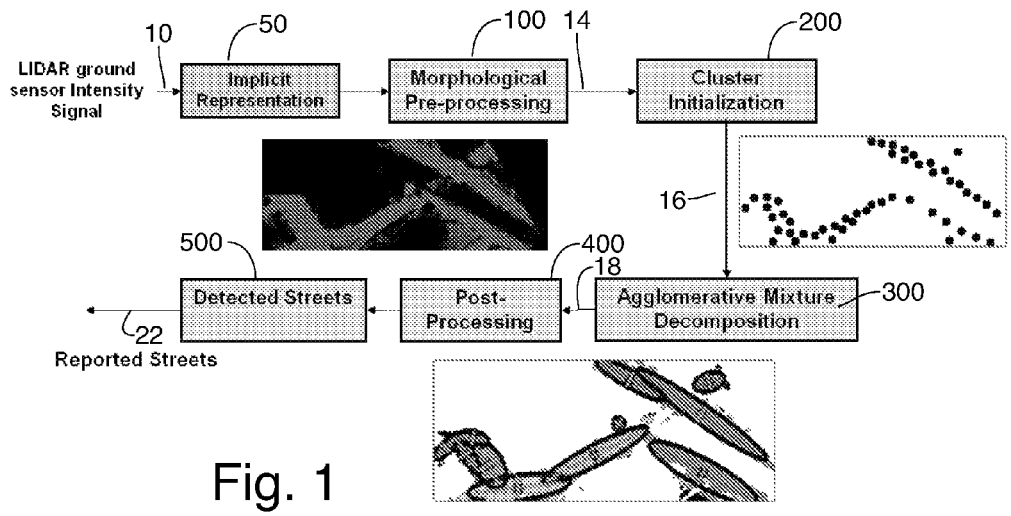
FIG. 1 is a block diagram of the street/road detection approach described herein

Road and street extraction from urban environments is a critical technology for intelligence agencies, aiding them in the automatic acquisition and updating of geographic information systems. Road and street grids also play an important and useful role in planning, mapping, traffic analysis, and navigation. Furthermore, awareness and understanding of vehicle surroundings is critical for driver assistance and avoiding accidents. Curb and median detection and awareness is useful in many applications such as navigation, autonomous vehicles, driver assistance, aids for visually impaired, etc. This disclosure relates to a computer program which may be used to extract this information from 3D LIDAR datasets and present it in a useful, often pictorial, fashion to an end user.

The presently described sensing system detects streets, curbs, and medians in urban environments using 3D LIDAR sensed data 10. Unlike vision-based aerial image processing systems, the presently described LIDAR based sensing system can detect the streets and curbs independent of the illumination or the time of the day.

As a quick overview, LIDAR datasets 10 are know in the art as are the LIDAR systems used to collect LIDAR datasets 10. The presently described approach initially converts a sensed 3D LIDAR dataset 10, which is obtained using techniques known in the art, into an implicit representation using a population function. Implicit representations are the opposite of explicit data representations which for 3D data are the actual x,y and z values for each of the points. Implicit representations are more like functions on the 3D space where one can obtain the actual value at any x, y, z location by looking up the function. Unlike explicit representations, implicit representations can easily handle operations at multiple resolutions since the cell size used to read the function value can be easily varied. In the present disclosure, we use a population function as our implicit representation. The population function breaks the 3D space into cells and each cell stores the number of points that fall in it. This implicit representation is suitable for fast processing and rapidly detecting objects of interest. The data resolution on which the algorithms were tested was mostly around 10 cm. For urban environments a processing resolution or cell size of 30 cm was empirically determined to be most suitable.

The resulting implicit representation is preferably pre-processed to filter out regions that do not have the spectral signature of streets, if such spectral information is available. The resulting regions are then converted to 2D points by slicing (the 3D points are flattened into a 2D image by discarding the depth information) and fed into an Agglomerative Gaussian Mixture Decomposition (AGMD) algorithm that automatically and parsimoniously fits the data with a set of Gaussian components. The flattening can be accomplished using the population function. The location of the ground along with a ±1 m slice is extracted and flattened into a 2D image. Pseudo code for the AGMD algorithm can be found in the document by S. Medasani and R. Krishnapuram, "Detection of the Number of components in Gaussian mixtures using agglomerative clustering," *Intl Conf. on Neural Networks*, 1997, noted above. The Gaussians are constrained to align with the dominant orientation of the supporting data thus aligning with the topological characteristics of the street neighborhoods. This is done preferably automatically by ensuring that Eqn. (4), below, is satisfied in each iteration of the AGMD algorithm.

The AGMD algorithm models the 2D image consisting of street regions using a parsimonious collection of 2D Gaussians. Each resulting Gaussian corresponds to a street segment as shown in FIG. 1. By selecting a Mahalanobis distance threshold, each of the Gaussians can be mapped to a corresponding ellipse. FIG. 3b shows the principal axis of the detected ellipses for a different dataset.

Upon convergence of the AGMD algorithm that has been constrained by Eqn. (4), we end up with Gaussian components along the streets in the flattened 2D image. Each of the Gaussians correspond to a piece-wise segment of the street as shown in FIG. 3b (only principal axis of the Gaussians are shown). Once the streets are detected further post processing and heuristic algorithms are preferably used to detect the curb and median regions which are in the neighborhood of detected streets. For example, one can use the locations of streets in x, y, z planes to filter the 3D data at 15 cm resolution so that the points corresponding to both streets and curbs can be extracted.

This processing will now be described in greater detail.

Figure 10:
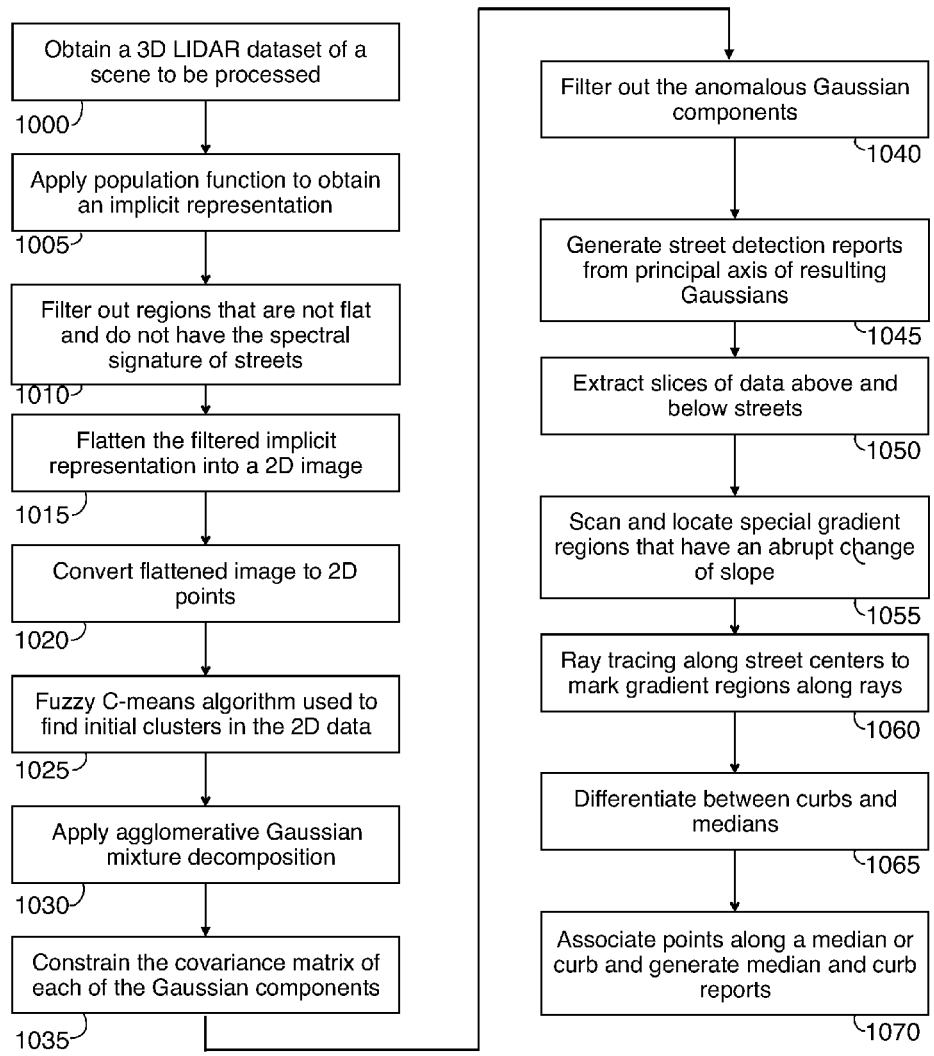
FIG. 10 is a flow chart showing the overall scheme disclosed herein for street curb and median detection using a supplied LIDAR dataset.

Conventional intensity data 10 is obtained from a terrestrial LIDAR sensor that generates a point cloud (of intensity data) 10 by scanning a laser across a scene from a ground or airborne platform (see step 1000, FIG. 10). The scene which will be used later in this disclosure is downtown portion of the city of Ottawa in Canada. The point cloud 10 representation is converted into an implicit representation using population functions, thereby aligning the points into uniform grid structures (see step 1005, FIG. 10). The implicit representation is then filtered using the estimated ground plane and the LIDAR signal intensity signature for roads (see step 1010, FIG. 10). As mentioned previously, this involves representing the scene as a collection of 3D cells and updating each cell with the number of points that fall within that cell.

The resulting representation is then converted into a collection of 2D points using the x and y coordinates of each of the cells in the implicit representation (see step 1015, FIG. 10). Recall that the 3D point cloud data is flattened by throwing away the z (depth) values and using only the x,y information so we can model the street related 2D points more effectively. The local ground plane and the spectral signature of streets are used to filter the 3D point cloud so only points below/above (±1 m) the ground and that have spectral signature like streets survive. This collection of points is then flattened since it is easier to use image processing methods to find the streets from the flattened image (see step 1020, FIG. 10).

The goal now is to model the 2D collection of points accurately using Gaussian kernels. The Fuzzy C-means algorithm is first used to initialize the 2D data collection with a pre-defined number of clusters using the Euclidean norm (see step 1025, FIG. 10). Typically we choose a large number of clusters, empirically determined from the amount of data collected, and in our case it was about 5-10% of the amount of data collected.

The AGMD algorithm that we refer to above is a variant of the standard Gaussian mixture decomposition.

The AGMD algorithm is applied on the 2D road point data to find a parsimonious set of Gaussians that can accurately model the data. The objective function is designed such that there is competition between the two terms in the objective function. If the first term (shown on the right hand side of Eqn. (3) below) in the objective function dominates then we end up with one cluster per point in the data and if the second term (also shown on the right hand side of Eqn. (3) below) in the objective function dominates then we end up with all points being modeled by one cluster. The first term attempts to model the likelihood of generating the data using a single cluster while the second term prefers to model each point using its own Gaussian. The balance of these terms will generate good likelihood models as well as use a compact number of clusters.

An annealing schedule is used to control the influence of the two terms in the objective function. In our implementation, the AGMD algorithm was iterated fifty times, the first fifteen iterations the influence of the second term increases linearly to peak at the 15th iteration—it stays steady for five more iterations and then linearly decreases to zero by the 35th iteration. After the 35th iteration the second term goes to zero and the first term ensures that the surviving components fine tune and model the data more accurately. The second term in essence causes the Gaussians to compete with each other in effectively modeling the data. Once the parameters for the competition are chosen in the right range the technique will return the correct number of components required to model the data. On convergence of the AGMD algorithm only the Gaussians required to model the data survive resulting in automatically finding the most relevant set of clusters needed to model the data. The Gaussians that do not have any points to model are overtaken by those that have points. See step 1030, FIG. 10.

The covariance matrix of each of the Gaussian components in the mixture is constrained to have a principal direction similar to the dominant orientation of the street objects they are attempting to model (see step 1035, FIG. 10). The dominant direction at any location is the local street orientation. The covariance matrix of the neighboring Gaussians are forced to align with each other and since the Gaussians model the street points the collection of Gaussians end up aligning with the dominant directions of the street grid. Once the AGMD algorithm converges and an appropriate number of Gaussians are obtained the Eigen vectors of the covariance matrix corresponding to smallest Eigen value gives the principal direction.

Once the algorithm parameters are properly assigned, each resulting Gaussian represents a street segment and the agglomeration process deletes the redundant Gaussians. The appropriate number of Gaussians for a point cloud depends on the number of streets in that area. This results automatically from the convergence of the AGMD algorithm. This algorithm takes a collection of points and generates as output a list of Gaussians that best model the underlying data. The input points to the AGMD algorithm are generated from the non-zero pixels in the flattened 2D image of FIG. 3a.

Each of the detected Gaussians can be visualized as an ellipse where the equation of the ellipse is derived from the x, y center of the Gaussian and the covariance matrix of the Gaussian determines the orientation of the ellipse. We found this to be an effective way to visualize the Gaussians that were obtained as a result of modeling the street data.

This principal direction or the major-axis of the ellipse is used to report the detected street. A post-processing step filters out the detected Gaussian components if they are anomalous in terms of component cardinality or other criteria (see step 1040, FIG. 10). In particular, as the agglomerative mixture decomposition algorithm runs through its iterations, each of the Gaussians models a few of the points. Some Gaussians end up modeling very few points (for example, twenty points) and need to be deleted. The component cardinality is a count of the number of points being modeled by a Gaussian. If this is less than some threshold value (twenty in this example), then the Gaussian is not modeling the data efficiently and therefore needs to be deleted.

A block diagram of the above described street/road detection approach is now depicted and described with reference to FIG. 1 in greater detail.

As shown in FIG. 1, the input LIDAR data 10 is converted into an Implicit Representation (using a population function at block 50—discussed above and shown as step 1005 in FIG. 10). In this particular case, in addition to the population count of points in each cell, the implicit representation preferably also stores the average intensity signal of all points that fall within that cell. This implicit representation is then flattened into a 2D image which becomes the input to the Morphological Pre-processing block 100.

Figure 2:
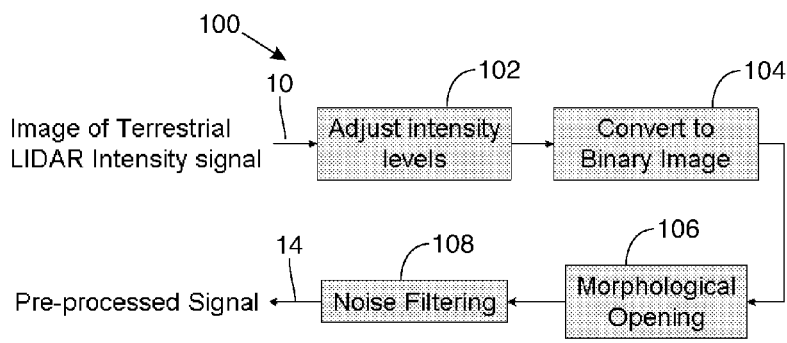
FIG. 2 is a block diagram of a pre-processing module.

FIG. 2 illustrates the details of the Morphological pre-processing block 100. The implicit representation of the input point cloud from block 50 is mapped into an orthographic image representation that is amenable to filtering. As depicted by FIG. 2, several pre-processing steps including adjusting the LIDAR return signal intensity-levels 102 and converting the image to a binary (black and while) version 104 are executed. A morphological opening operation 106 is executed to trim noisy edges that are prevalent at the boundaries of the road structures. The data is noisy especially if there are buildings, bushes, etc along the streets in the scene. The goal here is not to accurately extract the edges, but rather to filter out spurious appendages using morphological operations. So a noisy filtering operation 108 using the median filter is preferably used to suppress spurious data. For example, any isolated white pixels are eliminated using median filtering, a well-know technique. When the LIDAR signal is converted to implicit representation and flattened into an image—it is filtered so only the pixels with street type intensity values prevail. Street-type intensity values are typically empirically determined and depend on the LIDAR sensor. The materials used in streets are typically different from buildings and trees and therefore they reflect light differently resulting in different measured intensities of received light. Due to noise, pixels on the edges of roads could have similar intensity values as the actual street and are handled in our approach using morphological operations. These techniques are discussed more generally above with reference to step 1010 of FIG. 10.

The resulting data 14 is then converted into a collection of 2D points which are passed as input to a Fuzzy C-means software module 200 that initializes a pre-defined number of clusters using the 2D point data (discussed above with reference to step 1025 of FIG. 10). This conversion is preferably a straightforward transformation in which the 2D street image pixels are converted into a list of 2D (x,y) values so they can be clustered in 2D space. A Fuzzy C-means (FCM) algorithm is used with the Euclidean distance metric to find circular clusters in the data. The FCM result 16 is used as an initialization for the Agglomerative Mixture Decomposition Computation operation (see block 300) which is based on Gaussian mixture decomposition.

Gaussian Mixture Decomposition (GMD) has been used extensively to model a wide variety of data in pattern recognition and signal processing domains. Mixture decomposition is the process of finding the mixture parameters. The Expectation-Maximization (EM) algorithm is commonly used to find the mixture component parameters. In the EM approach, a likelihood function such as in Eqn. 1 is maximized to find the mixture parameters.

$$J = \Sigma_{j=1}^{N} \log(\Sigma_{i=1}^{c} p_{ij}) \quad \text{(Eqn. 1)}$$

In Eqn. 1, $p_{ij} = P(\omega_i)p(x_j|\omega_i,\theta_i)$ and $P(\omega_i)$, $i=1, \ldots, c$ represent mixing parameters and $p(x_j|\omega_i,\theta_i)$ represent the component densities. It can be shown that for Gaussian mixtures the Maximum-Likelihood estimates for mean, covariance, a posteriori probabilities, and mixing parameters are:

$$m_i = \Sigma_{j=1}^{N} \mu_{ij} x_j / \Sigma_{j=1}^{N} \mu_{ij} \quad \text{(Eqn. 2.1)}$$

$$c_i = \Sigma_{j=1}^{N} \mu_{ij}(x_j - m_i)(x_j - m_i)^T / \Sigma_{j=1}^{N} \mu_{ij} \quad \text{(Eqn. 2.2)}$$

$$\mu_{ij} = p_{ij} / \Sigma_{k=1}^{c} p_{kj} \quad \text{(Eqn. 2.3)}$$

$$P(\omega_i) = \frac{1}{N} \sum_{j=1}^{N} \mu_{ij} \quad \text{(Eqn. 2.4)}$$

In Eqn 2.2, $c_i$ is the center of the $i^{th}$ Gaussian, while in Eqn. 2.3, c is the number of Gaussian clusters. By using the update equations in (Eqns. 2.1-2.4) an iterative scheme such as the EM algorithm can be used to find the Gaussian parameters. However, the EM algorithm is very sensitive to initialization. To overcome this problem, we prefer to use agglomerative versions of EM. Agglomerative variants of EM algorithms (i.e., the AGMD algorithm) start with an over-specified number of components and iteratively prune weak components until a likelihood criterion (see the first term on the right hand side of Eqn. 3) is maximized. This approach provides the number of mixture components as well as the mixture parameters.

The objective function used is:

$$J = \Sigma_{j=1}^{n} \log(\Sigma_{i=1}^{c} p_{ij}) + \alpha \Sigma_{i=1}^{c} p(\omega_i) \log p(\omega_i) \quad \text{(Eqn. 3)}$$

The first term of Eqn. 3 is the log-likelihood function, maximized when each point is modeled by a component, the second term is the agglomeration term, maximized when all points are modeled by one component, and α is an annealing function that controls the degree to which the two terms interact and the choice of α can be learned from samples of the data (empirically, for a domain and not for each data set—we are effectively trying to find the relative values for each of the two terms so we can balance their influence in minimizing the objective function). Since the first term in Eqn. 3 is the same as the first term in the standard EM (see Eqn. 1), the update equations for the mean and covariance parameters for the Gaussians are the same as in Eqns. 2.1 and 2.2. The EM algorithm has the E and M steps, the E is the expectation step that computes the mu's ($\mu_{ij}$) and the M step is the maximization step that computes the Gaussian parameters. The resulting update equations for the mixing parameters in the M-step are however influenced by the second term in Eqn. 3 resulting in the following update equation:

$$P(\omega_i)^{(t)} = \frac{\sum_{j=1}^{n} \mu_{ij} + \alpha D_i^{(t-1)}}{n + \alpha \sum_{k=1}^{c} D_k^{(t-1)}} \quad \text{(Eqn. 4)}$$

where $D_k^{(t-1)} = P(\omega_i)^{(t-1)} + P(\omega_i)^{(t-1)} \log(P(\omega_i)^{(t-1)})$.

In the above update equation, $\mu_{ij}$ is the a posteriori probability of sample $x_j$ belonging to $i^{th}$ Gaussian component. $\mu_{ij}$ is calculated using Eqn. 2.3.

In addition to estimating the Gaussian components we need to constrain the Gaussians so they align with each other and preserve the geometric structure of the street grid. This step is important since without it the Gaussians modeling a single long street would end up being misaligned. The Gaussians are constrained to have a similar orientation as their neighboring Gaussians and since only Gaussians that best model the streets survive, the aligned Gaussians naturally end up along the street grid.

The general equation of an ellipse is $Ax^2 + Bxy + Cy^2 Dx + Ey + F = 0$.

The Bxy term is zero if the ellipse is aligned with the Cartesian grid. The angle θ that the principal axis of the ellipse makes with the axis can be shown to be:

θ=0.4*a cot(A−C,B), provided B≠0.     (Eqn. 5)

In each iteration of the Agglomerative Gaussian Mixture Decomposition (AGMD) process in block 300 the parameters of each of the Gaussian components is estimated. The covariance matrix is used in the AGMD algorithm to determine an elliptical bound such that all points within the elliptical bound contribute to the estimation of the parameters and those outside the bound are ignored (see also the discussion above with reference to step 1035 of FIG. 10). We can show that $(x-\mu_i)^T \Sigma_i^{-1}(x-\mu_i)=MD$ where $$\sum_i = \begin{bmatrix} a & b \\ c & d \end{bmatrix}$$

is the covariance matrix of the component results in an elliptical bound that is a squared Mahalanobis Distance (MD) away from the center of the Gaussian. In order to constrain the Gaussians to align with each other and in turn with the street grid the covariance matrix estimated in each iteration should be constrained to satisfy (Eqn. 5). This constraint ensures that the Gaussians will compete with each other and grow along the streets instead of in arbitrary directions and end up modeling the street grid topology more efficiently. The post-processing step (see block 400 in FIG. 1) uses simple heuristics on cluster size (minimum number of points to preserve clusters) to filter out some Gaussians that may have survived the AGMD step.

Some of the preliminary results using this approach will now be discussed. In FIGS. 3a and 3b, we show the input ground-sensor intensity data as an image for a small portion of the Ottawa street grid. The detected Gaussians are then reported as line objects and overlaid in the view of FIG. 3b. In FIG. 3b only the major axes are shown since they align along the roads. The minor axis provide information regarding the extent or the width of the road. FIG. 4 shows the result of processing the entire Ottawa downtown tiles to find the Ottawa downtown street grid. In FIGS. 5, 6a and 6b, show the resulting street grid overlaid with on the actual point cloud. The street grid appears as very light gray rectangular objects or segments in these figures. As mentioned above, these very light gray line segment reports are generated using the principal axes of the detected ellipses. The street grid is provided at a data output 22 of block 500 of FIG. 1.

Once the street grid is successfully extracted (see steps 1000-1045 of FIG. 10), the next operation is to use this context to detect curbs and medians. Medians are defined as elevated portions of the data that are present along streets and between curbs. The block diagram of FIG. 10 continues with steps 1050-1070 to detect curbs and medians and the preferred approach to detect curbs and medians is shown in greater detail by FIG. 7.

First a slice of data that is either above or below and very close to, namely, ±1 m of the detected streets is extracted from the original 3D point cloud 10 at block 702. This slice contains the regions surrounding the streets and slices of objects that are in the regions surrounding the streets which could include cars, buildings, lamp posts, etc. Note that a separate ground plane extraction module preferably is used to find the ground plane so the data can be sliced with respect to the ground plane (see step 1050 of FIG. 10). See U.S. patent application Ser. No. 12/644,349, identified above, for one way of doing ground plane extraction.

Figure 7:
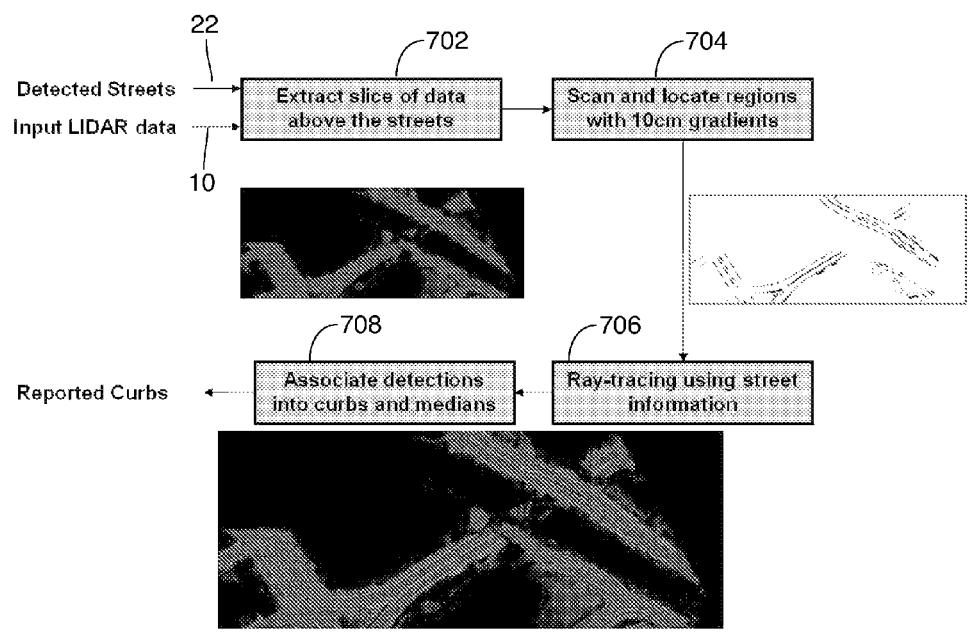
FIG. 7 is a flow diagram of the curb/median detection process.

All the data from the extracted slice is projected into an orthographic image with the max Z value representing the pixel intensity (see block 702 of FIG. 7). Each pixel is analyzed and those pixels whose max difference across other pixels within an 8-neighborhood (an 8-neighborhood are the eight surrounding neighbors of a pixel when considering a 3×3 grid where the pixel in question is located at the center of the 3×3 grid) is between 10 and 40 cm (the typical gradients that curbs have with streets—regions where an abrupt change of slope occurs as you traverse from the center of the street to the edges of the street) are computationally marked (see step 1055 of FIG. 10). The 8-neighborhood may be replaced with a larger neighborhood, such as a 24-neighborhood (for a 5×5 grid) if the LIDAR data resolution permits or requires a larger span of pixels to span the distance of 10 to 40 cm mentioned above. An edge linking step using the Hough transform is preferably used to preserve only the longer edges. One can decide what are the "longer" edges which are retained by passing the pixels that survive the gradient threshold through a Hough transform and applying a threshold on the peaks in the Hough space. Only lines with a lot of points would then survive and spurious segments would get filtered away. The preserved long edges are then used to create a gradient mask.

The next block 706 involves using the reported streets output from FIG. 1 and ray tracing techniques to find the curb and median points. The span of each of the detected streets is first parsed into a set of equally spaced points along the street reports and from each of the selected points a ray is traced out on either side of the street. See step 1060 of FIG. 10. The intersection of the ray with all the previously marked edge points, i.e., points that could be curbs, medians, cars, buildings, and other objects are marked up. Along with marking each of the edge points the edge transitions are also computed. All the marked edges from one end of the traced ray to the other end are processed using heuristic rules to stitch them together into curbs and medians.

Some exemplary heuristic rules are as follows:

The count of curb-like pixels in the neighborhood (whose width is, for example, 5 units) must be greater than curb pixel threshold (for example, 20 points) for current pixel to be classified as curb-like.

When the number of missing curb points is greater than a NumAllowedMisses threshold (currently set to 2) then a new curb group is created and appended to the current curb line. A curb line is a concatenation of curb groups some of which could have missing segments between neighbors.

A transition matrix is created by computing the distance of the curb point to the street lines including references such as left, left middle, right middle, and right. The distances in the transition matrix are parsed (in sort order) to create a result matrix that tells the points that need to be preserved and the curb group they need to be assigned to. The result matrix is read and used to string the curb points into the corresponding curb lines If there are more than two curb lines, find the median curb line and the side curb lines by arranging them in order spanning one edge of the road to the other edge of the road.

With respect to the heuristic rules, the main idea is that once the curbs edges are found on either side of the road, then the middle of the road is traversed and at each location a ray is sot out to find the intersection points of the ray on either side with the curb boundary. Once all the curb boundary intersection points are marked up, each of the curbs is traversed (left and right) and the points are stitched into a single line report. The heuristic rules come into play when there is a median involved and the gradient step sign changes as care should be taken in stitching only the points that are on the same side of the road and also have the same gradient.

Edges that are close to the street reports are marked as medians if they satisfy the heuristics that they are close to the street reports, have the right transitions, and both left and right median points exist. The marked edges that are farther away from the street reports are then combined using heuristics into curb reports. The heuristics also account for gaps in the detected edges as we traverse the street reports and also handle the intersections. See steps 1065 and 1070 of FIG. 10.

Figure 8:
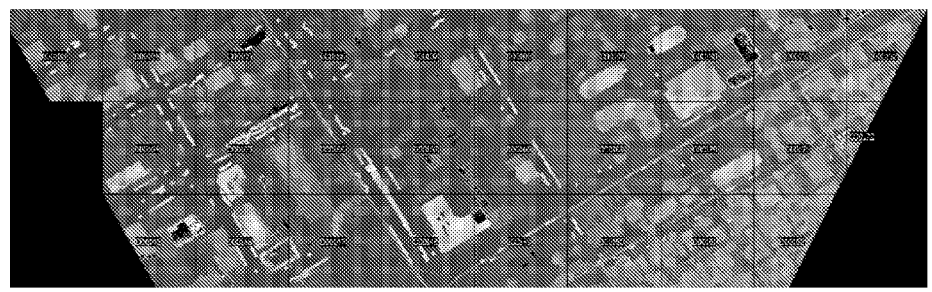
FIGS. 8 and 9 are results that show detected curbs and median for two different Ottawa scenes.
Figure 9:
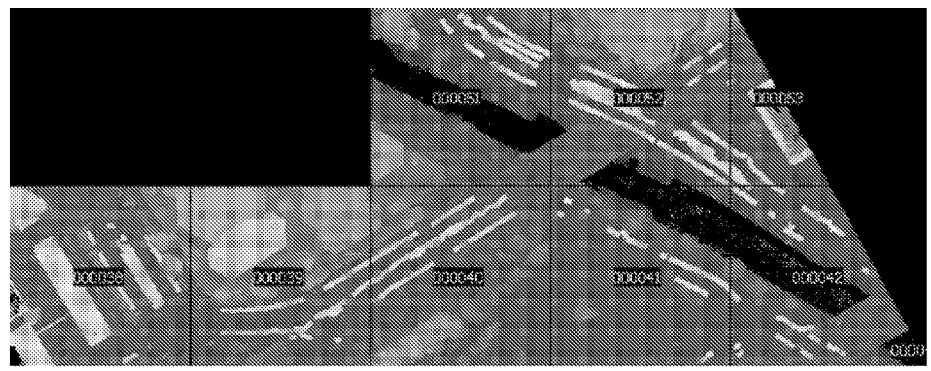

An example of the detected curbs and medians overlaid in very light gray on the point cloud is shown in FIGS. 8 and 9.

It should be understood that the above-described embodiments are merely some possible examples of implementations of the presently disclosed technology, set forth for a clearer understanding of the principles of this disclosure. Many variations and modifications may be made to the above-described embodiments of the invention without departing substantially from the principles of the invention. All such modifications and variations are intended to be included herein within the scope of this disclosure and the present invention and protected by the following claims.

What is claimed is:

1. A method of extracting street and road data from a dataset obtained using LIDAR techniques to scan a terrestrial region of the earth's surface of interest to form said dataset, the method comprising the steps of:
   converting said dataset into an implicit representation using a population function;
   flattening the implicit representation into a 2D image;
   converting the 2D image into 2D point data which are supplied to an agglomerative Gaussian mixture decomposition module, the agglomerative Gaussian mixture decomposition module automatically and parsimoniously fitting the 2D point data with a set of Gaussian components; and
   modeling a segment of a street grid in the dataset by Gaussian models and constraining the Gaussian models to align with each other and a dominant orientation of the streets in order to detect streets.

2. The method of claim 1 further including filtering the implicit representation to filter out regions that do not have the spectral signature of streets.

3. The method of claim 1 wherein after streets are detected, data representing the detected street is input to a ray tracing technique along with a slice of the dataset around the detected streets, the ray tracing technique finding curb and median points and using heuristic associations or algorithms to stitch detected curb and median points into a curb and median report associated with said street grid.

4. The method of claim 3 wherein the ray tracing techniques look for gradient changes and where an abrupt gradient change is determined, making a 2D point associated with the abrupt gradient change as either a median edge or a curb edge depending on the sign of the gradient change.

5. A method of extracting curb data from street and road data obtained from a dataset obtained using LIDAR techniques to scan a terrestrial region of the earth's surface of interest to form said dataset, the method comprising the steps of:
   inputting data representing the street and road data input into a ray tracing algorithm along with a slice of the dataset around detected streets, finding gradients in the slice of data and filtering the gradients so that only abrupt gradient changes remain, the ray tracing algorithm finding curb and median points using the abrupt gradient changes; and
   using heuristic associations or algorithms to stitch detected curb and median points into said curb data associated with said street grid.

6. The method of claim 5 wherein the ray tracing algorithm begins each trace from a center of a street or road using the street and road data and tracing outwardly from a principal direction of said street or road where the ray tracing is occurring.

7. The method of claim 6 wherein the ray tracing algorithm upon detecting an abrupt gradient change in the street and road data, if the abrupt gradient change indicates a depression, marking a point corresponding to the abrupt gradient change indicating a depression as corresponding to a median and if the abrupt gradient change indicates a protrusion, marking a point corresponding to the abrupt gradient change indicating a protrusion as corresponding to a curb.

8. A method of extracting curb and median data from street and road data obtained from a dataset obtained using LIDAR techniques to scan a terrestrial region of the earth's surface of interest to form said dataset, the method comprising the steps of:
   inputting data representing the street and road data input into a ray tracing algorithm along with a slice of the dataset around detected streets, the ray tracing algorithm finding curb and median points; and
   using heuristic associations or algorithms to stitch detected curb and median points into said curb and median data associated with said street grid.

9. The method of claim 8 wherein the ray tracing algorithm begins each trace from a center of a street or road using the street and road data and tracing outwardly from a principal direction of said street or road where the ray tracing is occurring.

10. The method of claim 9 wherein the ray tracing algorithm upon detecting an abrupt gradient change in the street and road data, if the abrupt gradient change indicates a depression, marking a point corresponding to the abrupt gradient change indicating a depression as corresponding to a median and if the abrupt gradient change indicates a protrusion, marking a point corresponding to the abrupt gradient change indicating a protrusion as corresponding to a curb.

* * * * *